Feb. 16, 1960 Y. W. HARROD 2,925,124
RIM ANCHORED TIRE DEMOUNTING DEVICE
Filed Dec. 12, 1958
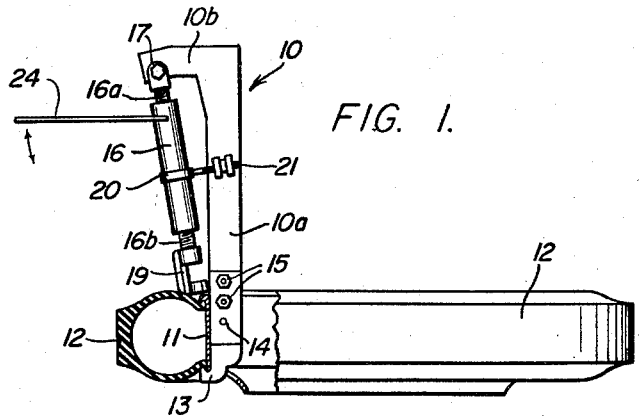
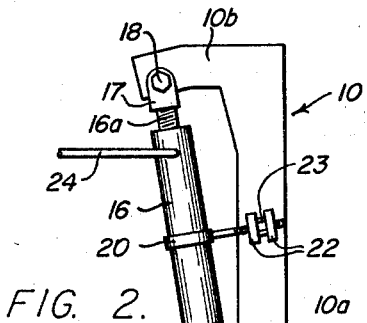
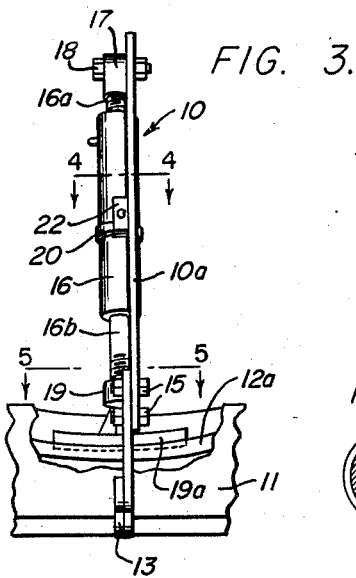
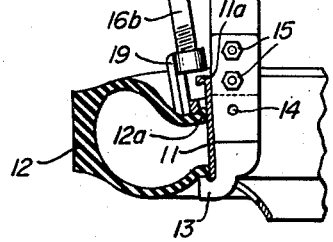
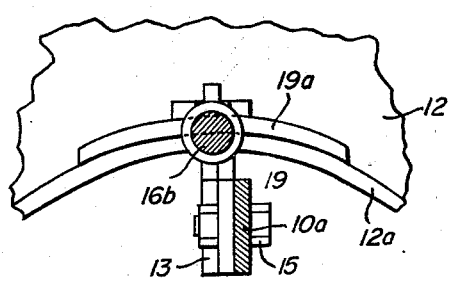
INVENTOR.
YEUELL W. HARROD
BY *Mallinckrodt and Mallinckrodt*
ATTORNEYS

2,925,124
RIM ANCHORED TIRE DEMOUNTING DEVICE

Yeuell W. Harrod, Sandy, Utah

Application December 12, 1958, Serial No. 780,004

1 Claim. (Cl. 157—1.26)

This invention relates to devices for aiding the removal of pneumatic tires from the rims on which they are mounted, and is particularly concerned with devices for forcing tightly held beads of heavy truck and tractor tires out of mounted position on wheel rims so that the tires can be easily removed for repair or replacement.

The demounting of a heavy truck or tractor tire is an especially difficult job, which is next to impossible to accomplish without special equipment.

A number of devices have been developed for the purpose, but, for one reason or another, have not been favorably received.

An object of the present invention is to provide an especially handy and compact device for the purpose, which is readily adaptable to a variety of tire and wheel sizes, is easy to use, is simple in construction, is positive in operation, and can be manufactured at reasonable cost.

A feature of the invention is the provision of an inverted L-shaped standard having a rim-engaging foot, together with a jack pivotally attached at one of its ends to the overhanging bar of the standard and having a bead-engaging shoe at its opposite end for exerting thrust against the tire when the jack is operated.

Another feature is the provision of an adjustable tie-rod between jack and standard intermediate their lengths for holding the bead-engaging shoe in precise relationship with the rim-engaging foot of the standard.

As so constructed, the device of the invention may be easily adjusted to fit a given size of tire and rim and may be quickly applied, used, and removed in practice.

Further objects and features of the invention will become apparent from the following detailed description of the presently preferred specific form illustrated by way of example in the accompanying drawing.

In the drawing:

Fig. 1 represents a side elevation, partly in vertical section, of the device of the invention applied to the rim of a wheel from which the tire is to be demounted;

Fig. 2, a view corresponding to the left-hand portion of Fig. 1, but drawn to a somewhat enlarged scale and showing the device following actuation thereof to displace that bead of the tire which is normally tightly adherent to the shouldered edge of the rim;

Fig. 3, a rear elevation of the device as shown in Fig. 2;

Fig. 4, a horizontal section taken on the line 4—4 of Fig. 3 and drawn to an enlarged scale; and Fig. 5, a horizontal section taken on the line 5—5 of Fig. 3 showing the tire and parts of the device in the background, the view being drawn to the enlarged scale of Fig. 4.

Referring to the drawing:

The device of the invention comprises, in the preferred form here illustrated, an inverted L-shaped standard 10 fabricated in any suitable manner from a rigid material, such as steel, and having at its lower end anchoring means adapted to engage the rim 11 upon which a pneumatic tire 12 is mounted.

In this illustrated instance, the anchoring means is in the form of a hook-shaped foot 13 formed independently of the standard 10 and arranged for securement thereto in a selected position of longitudinal adjustment relative to the standard afforded by the provision of bolt holes 14 through which bolts 15 extend and rigidly attach the foot in place. In this way, the length of the leg member 10a of standard 10 can be increased or decreased at will to adapt the device to rims and tires of different sizes.

Anchoring foot 13 has its hook formation projecting in the same direction as the bar member 10b of standard 10, and is adapted to engage the unshouldered edge of the rim 11 from which the customary locking ring (not shown) has been removed. In use, see Figs. 1 and 2, the foot 13 engages the rim while the standard proper extends through the open center of the rim with its bar member 10b projecting over the tire 12.

In addition to the standard and the anchoring means, the device comprises a jack which is articulatively connected at its base to the bar member 10b of standard 10 for exerting thrust against the tire while utilizing the standard as a reaction structure. It also comprises a shoe for applying the thrust of the jack to the corresponding bead portion of the tire, and, advantageously, means for adjustably anchoring the jack relative to the standard.

In the illustrated instance, the jack 16 is a hydraulic unit of a type used in automotive repair for body and frame straightening. It is readily obtainable commercially, under the trade designation BU 300. As so purchased, it is provided with a threaded stud 16a at its base end and with a thrust member 16b whose outer end is threaded.

For the purpose of this invention, an adapter 17 is screwed onto the base end 16a of jack 16 and is pivotally attached to the outer end of bar member 10b by means of pivot pin 18 passing through spaced ears of the adapter which receive the bar member. In this way, the jack is firmly based on the L-shaped standard as a reaction structure and is free to swing toward and away from the leg 10a of the standard over the tire 12.

Screwed to the other end of the jack, directly onto the thrust member 16b thereof, is a thrust-imparting shoe 19, which is preferably formed with an elongate shoe member 19a, see especially Fig. 5, curved to approximate the curvature of the corresponding bead 12a of the tire 12.

For anchoring the jack in adjusted position relative to the standard, a ring 20 having a threaded shank 21 is secured about the body of jack 16, with its shank extending back toward and alongside leg member 10a of the standard. A pair of mutually spaced lugs 22 project from securement to such leg member 10a and are provided with receiving openings through which shank 21 extends. Threaded on shank 21 between the lugs 22 is an adjustment nut 23, which enables the position of shoe member 19a to be set as required for different sizes of wheels and tires.

In operation, when the device is applied as shown in Fig. 1, handle 24 of the jack is pumped up and down in the usual manner to extend thrust member 16b and forcibly depress bead 12a from its normally tightly-adherent position against shoulder 11a of rim 11. The device may be easily moved from one position to another circumferentially of the rim for completely releasing the adherent bead 12a of the tire.

Whereas this invention is here illustrated and described with respect to a presently preferred specific embodiment thereof, it should be understood that various changes may be made without departing from the essential inventive concepts.

I claim:

A demounting device for tires, comprising a rim-engaging standard of substantially inverted L-shape having anchoring means at its lower end adapted to engage the rim upon which the tire is mounted while the standard proper extends through the open center of the rim with the bar member of the L projecting over the tire; a jack having a threaded stud projecting from its base end and having a threaded thrust member directed toward said lower end of the standard; an adaptor fitting pivotally secured to said bar member of the standard and having an internally threaded socket into which said stud is screwed, said jack being swingable toward and away from said standard; a tire-engaging shoe threaded onto said thrust member of the jack; a ring retainer concentrically encircling the body of said jack and having a stem extending toward said standard; and means on said standard for retracting or extending said stem and for therewith moving said jack into desired adjusted position relative to said standard.

References Cited in the file of this patent

UNITED STATES PATENTS

| | | |
|---|---|---|
| 1,475,518 | Snider | Nov. 27, 1923 |
| 2,616,487 | Parks | Nov. 4, 1952 |
| 2,678,089 | Grant | May 11, 1954 |
| 2,679,896 | Branick | June 1, 1954 |
| 2,842,191 | Coats | July 8, 1958 |
| 2,844,194 | Marshall | July 22, 1958 |